US007931095B2

(12) United States Patent
Machida et al.

(10) Patent No.: US 7,931,095 B2
(45) Date of Patent: Apr. 26, 2011

(54) HAMMER DRILL

(75) Inventors: Yoshitaka Machida, Anjo (JP); Kiyonobu Yoshikane, Anjo (JP)

(73) Assignee: Makita Corporation, Anjo (JP)

( * ) Notice: Subject to any disclaimer, the term of this patent is extended or adjusted under 35 U.S.C. 154(b) by 184 days.

(21) Appl. No.: 12/457,334

(22) Filed: Jun. 8, 2009

(65) Prior Publication Data

US 2010/0000748 A1 Jan. 7, 2010

(30) Foreign Application Priority Data

Jul. 3, 2008 (JP) ................................ 2008-174767

(51) Int. Cl.
*B23B 45/16* (2006.01)

(52) U.S. Cl. .......................... 173/48; 173/93.6; 173/104

(58) Field of Classification Search .................... 173/48, 173/216, 217, 93.6, 104
See application file for complete search history.

(56) References Cited

U.S. PATENT DOCUMENTS

| | | | | | |
|---|---|---|---|---|---|
| 2,385,439 | A | | 9/1945 | Gubbins | |
| 3,828,863 | A | * | 8/1974 | Bleicher et al. | 173/48 |
| 3,847,229 | A | * | 11/1974 | Wanner et al. | 173/48 |
| 4,732,217 | A | * | 3/1988 | Bleicher et al. | 173/104 |
| 6,035,945 | A | * | 3/2000 | Ichijyou et al. | 173/48 |
| 6,213,222 | B1 | * | 4/2001 | Banach | 173/1 |
| 6,971,455 | B2 | | 12/2005 | Shibata et al. | |
| 7,174,969 | B2 | * | 2/2007 | Droste | 173/48 |
| 2004/0231866 | A1 | * | 11/2004 | Droste | 173/48 |

FOREIGN PATENT DOCUMENTS

| | | | |
|---|---|---|---|
| BE | 442 125 | A | 7/1941 |
| EP | 1 413 401 | A1 | 4/2004 |
| EP | 1 422 028 | A1 | 5/2004 |
| EP | 1 652 629 | A1 | 5/2006 |
| JP | A-2004-167638 | | 6/2004 |

OTHER PUBLICATIONS

Extended European Search Report issued in European Patent Application No. 09008626.5 on Oct. 2, 2009.

* cited by examiner

*Primary Examiner* — Brian D Nash
(74) *Attorney, Agent, or Firm* — Oliff & Berridge, PLC

(57) ABSTRACT

In a hammer drill, a coil spring is disposed rearward of a piston cylinder inside a housing so as to press the piston cylinder to an advanced position when the hammer drill operates in a drill mode, and a supporting plate is disposed at a rear end of the piston cylinder. The supporting plate includes a pair of side plates and a base portion connecting front ends of the side plates. The base portion is in contact with a rear surface of the piston cylinder, and rear ends of the side plates are in contact with a front end of the coil spring. Openings provided in the side plates are configured to hold a pin on which a connecting arm is pivoted.

13 Claims, 5 Drawing Sheets

HAMMER DRILL

BACKGROUND OF THE INVENTION

This application claims the entire benefit of Japanese Patent Application Number 2008-174767 filed on Jul. 3, 2008, the entirety of which is incorporated by reference.

TECHNICAL FIELD

This invention relates to a hammer drill capable of imparting rotatory and/or impacting motion to a bit with which it is tipped.

BACKGROUND ART

A hammer drill for example as disclosed in JP 2004-167638 A (corresponding patent documents were also published under U.S. Pat. No. 6,971,455 B1, EP 1422028 B1 and RU 2258125 C2) is known in the art. This hammer drill comprises a housing, a tool holder rotatably supported in a front space inside the housing, a piston cylinder reciprocatably disposed in a rear space inside the tool holder, an impactor disposed inside the piston cylinder, and an intermediate shaft rotatably supported in a position parallel to the tool holder in a lower space (below the tool holder) inside the housing. The tool holder has a front end portion configured to hold a bit. The hammer drill further comprises a motor having an output shaft, a rotatory motion of which is transmitted to the intermediate shaft. The intermediate shaft is provided with a clutch member, a second gear, a boss sleeve, and a mode switch lever (mode selector). The clutch member is configured to be rotatable together with the intermediate shaft and slidable in an axial direction of the intermediate shaft. The second gear is a rotation transmission member which is loosely fitted on the intermediate shaft in a position frontward of the clutch member and arranged to mesh with a gear provided on the tool holder. The boss sleeve is an impact transmission member which is loosely fitted on the intermediate shaft in a position rearward of the clutch member. A swash bearing is rotatably fitted on an outer peripheral surface of the boss sleeve. A connecting arm is provided on an upper surface of the swash bearing to protrude upward. A protruded end portion of the connecting arm is coupled to a rear end of the piston cylinder. The mode switch lever has pins provided in eccentric positions with respect to a pivot of the mode switch lever; the pins are configured to be engageable in a groove provided on an outer peripheral surface of the clutch member.

To be more specific, motion of the pins eccentric to the pivot of the mode switch lever, which is made by the operation of rotating the mode switch lever, causes the clutch member to slide along the intermediate shaft so that the clutch member is engaged with both of the second gear and the boss sleeve, or engaged with either one of them and disengaged from the other. In this way, three selectable operation modes are provided: a drill mode in which the clutch member is engaged only with the second gear to impart only rotatory motion to the bit; a hammer mode in which the clutch member is engaged only with the boss sleeve to impart only impacting motion to the bit; and a hammer drill mode in which the clutch member is engaged with both of the second gear and the boss sleeve to impart rotatory plus impacting motion to the bit.

When the hammer drill as described above is used in the drill mode, the friction between the outer surface of the intermediate shaft and the inner surface of the boss sleeve in contact causes the boss sleeve to rotate, which in turn causes the connecting arm provided on the swash bearing fitted on the outer peripheral surface of the boss sleeve to swing. As a result, the piston cylinder coupled to the connecting arm would disadvantageously be caused to reciprocate, thereby imparting the impacting motion to the bit. In order to prevent such an unnecessary impacting motion to the bit, a coil spring provided rearward of the piston cylinder so as to press the piston cylinder to an advanced position when the hammer drill is in the drill mode could conceivably be used to advantage as proactive measures. However, the coil spring thus provided would be constantly pressing the rear end of the piston cylinder irrespective of the operation modes selected, and could cause the piston cylinder to be worn away, thus diminishing its durability.

Thus, there is a need to provide a hammer drill in which an unnecessary impacting motion in a drill mode can effectively be prevented without diminishing the durability of a piston cylinder.

The present invention has been made in an attempt to eliminate the above disadvantages, and illustrative, non-limiting embodiments of the present invention may overcome the above disadvantages and other disadvantages not described above.

SUMMARY OF INVENTION (1) A first aspect of the present invention is to provide a hammer drill which comprises:

a housing;

a tool holder rotatably supported in a front space inside the housing, the tool holder having a front end portion configured to hold a bit;

a piston cylinder reciprocatably disposed in a rear space inside the tool holder;

an impactor disposed inside the piston cylinder and configured to strike the bit as installed at the front end portion of the tool holder;

an intermediate shaft rotatably supported in a position below and parallel to the tool holder inside the housing;

a motor disposed rearward of the housing, the motor having an output shaft, a rotatory motion of which is transmitted to the intermediate shaft;

a rotation transmission member disposed on a front portion of the intermediate shaft, the rotation transmission member being rotatable independently of the intermediate shaft, and configured such that a rotation of the rotation transmission member causes a rotatory motion of the intermediate shaft to be transmitted to the tool holder;

an impact transmission member disposed on a rear portion of the intermediate shaft, the impact transmission member comprising a portion rotatable independently of the intermediate shaft and a connecting arm pivotally coupled to a rear end of the piston cylinder, the impact transmission member being configured such that a rotation of the impact transmission member causes the rotatory motion of the intermediate shaft to be converted into a reciprocating motion and the resulting reciprocating motion to be transmitted to the piston cylinder;

a clutch member configured to be rotatable together with the intermediate shaft and slidable in an axial direction of the intermediate shaft between the rotation transmission member and the impact transmission member, the clutch member being manipulatable from outside the housing to be slid until the clutch member is engaged with both of the rotation transmission member and the impact transmission member, or engaged with either one and disengaged from the other, thereby allowing selection of operation modes. The modes comprise: a drill mode in which only the rotation transmission member is caused to rotate so that the tool holder rotates; a hammer mode in which only the impact transmission member is caused to rotate so that the piston cylinder reciprocates; a hammer drill mode in which both of the rotation transmission member and the impact transmission member are caused to rotate so that the tool holder rotates and the piston cylinder reciprocates;

a coil spring disposed rearward of the piston cylinder inside the housing so as to press the piston cylinder to an advanced position when the hammer drill is in the drill mode;

a supporting plate disposed at the rear end of the piston cylinder, wherein the supporting plate comprises a pair of side plates having front ends, rear ends and openings respectively, and a base portion connecting the front ends of the side plates, the base portion of the supporting plate being in contact with a rear surface of the piston cylinder, the rear ends of the side plates being in contact with a front end of the coil spring, and the openings of the side plates being configured to hold a pin on which the connecting arm is pivoted.

According to a second aspect of the present invention, in the configuration according to the first aspect, the supporting plate may further comprise projections provided at the rear ends of the side plates and configured to be inserted into a front end portion of the coil spring. This additional feature may serve to consistently maintain the pressing action of the coil spring applied through the supporting plate.

According to a third aspect of the present invention, in the configuration according to the first aspect, the base portion of the supporting plate may have a vertical dimension greater than those of the side plates. With this feature, the supporting plate can be stably positioned at the piston cylinder.

According to a fourth aspect of the present invention, in the configuration according to the first aspect, the base portion of the supporting plate may have a trimmed portion provided in a midsection between upper and lower sections of the base portion at the front ends of the side plates and configured to be out of contact with the rear surface of the piston cylinder. With this feature, the supporting plate can be installed with increased ease.

Various implementations according to the present invention as will be described later can achieve several advantageous effects as follows:

According to the configuration described above in the first aspect, with the help of the supporting plate provided at the rear end of the piston cylinder, an unnecessary impacting motion in a drill mode can effectively be prevented without diminishing the durability of the piston cylinder.

According to the configuration with the additional feature described above in the second aspect, with the help of the projections provided at the rear ends of the side plates, the coil spring can be prevented from coming off from the supporting plate, so that the pressing action of the coil spring applied through the supporting plate can advantageously be maintained well.

According to the configuration with the additional feature described above in the third aspect, the supporting plate can be stably positioned at the piston cylinder, so that the supporting plate provided according to the present invention will not cause a rattle by any means.

According to the configuration with the additional feature described above in the fourth aspect, the trimmed portion can impart a desirable lateral elasticity to the supporting plate, so that the supporting plate can be installed at the rear end of the piston cylinder with increased ease. This trimmed portion may also enable to achieve a weight reduction of the supporting plate.

BRIEF DESCRIPTION OF THE DRAWINGS

The above aspect, other advantages and further features of the present invention will become more apparent by describing in detail illustrative, non-limiting embodiments thereof with reference to the accompanying drawings, in which.

DESCRIPTION OF EMBODIMENTS

Exemplary embodiments of the present invention will be described hereinafter with reference to the accompanying drawings.

Figure 1:
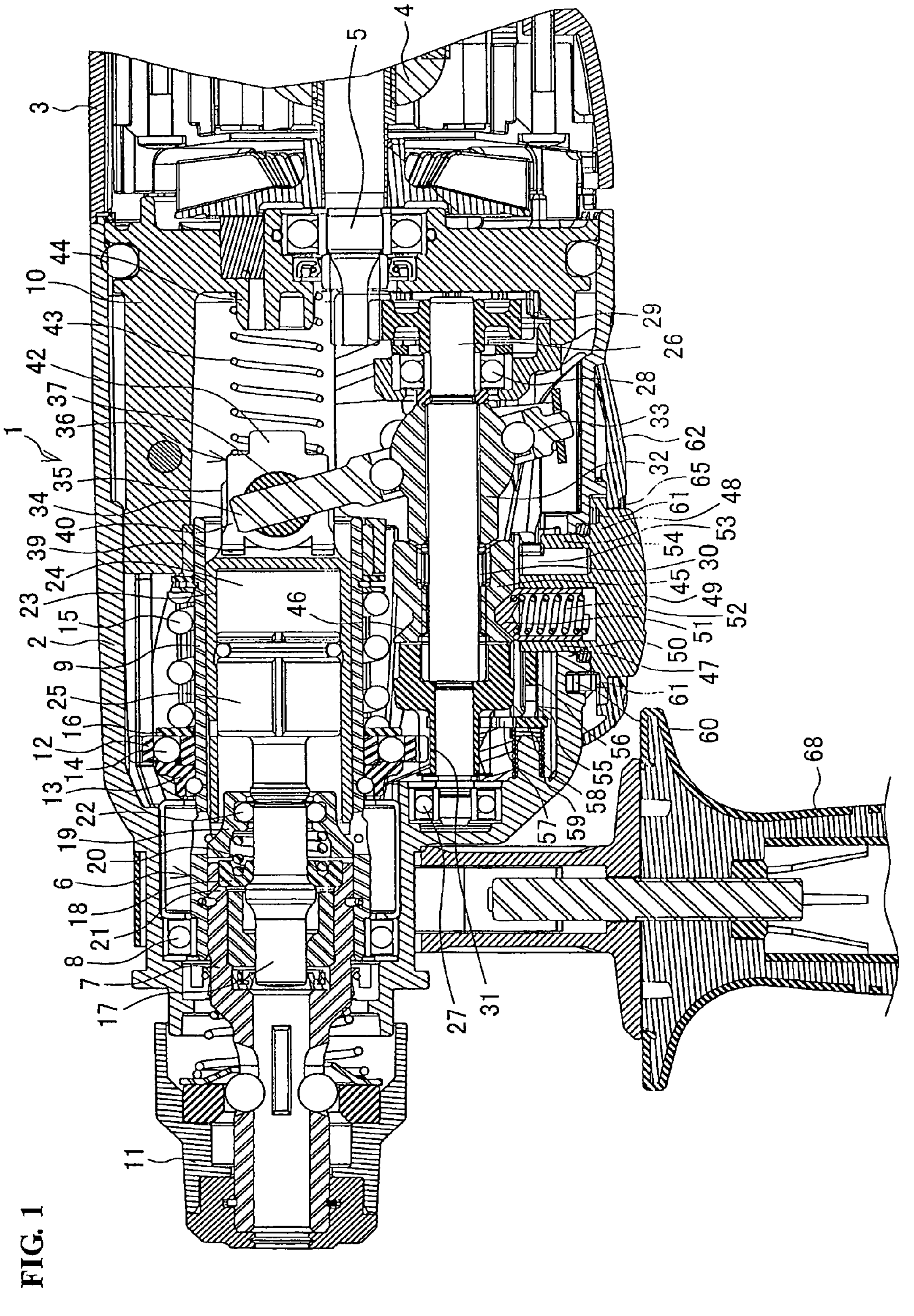
FIG. 1 is a partially illustrated longitudinal section of a hammer drill (operating in a drill mode) according to an exemplary embodiment of the present invention.
Figure 2:
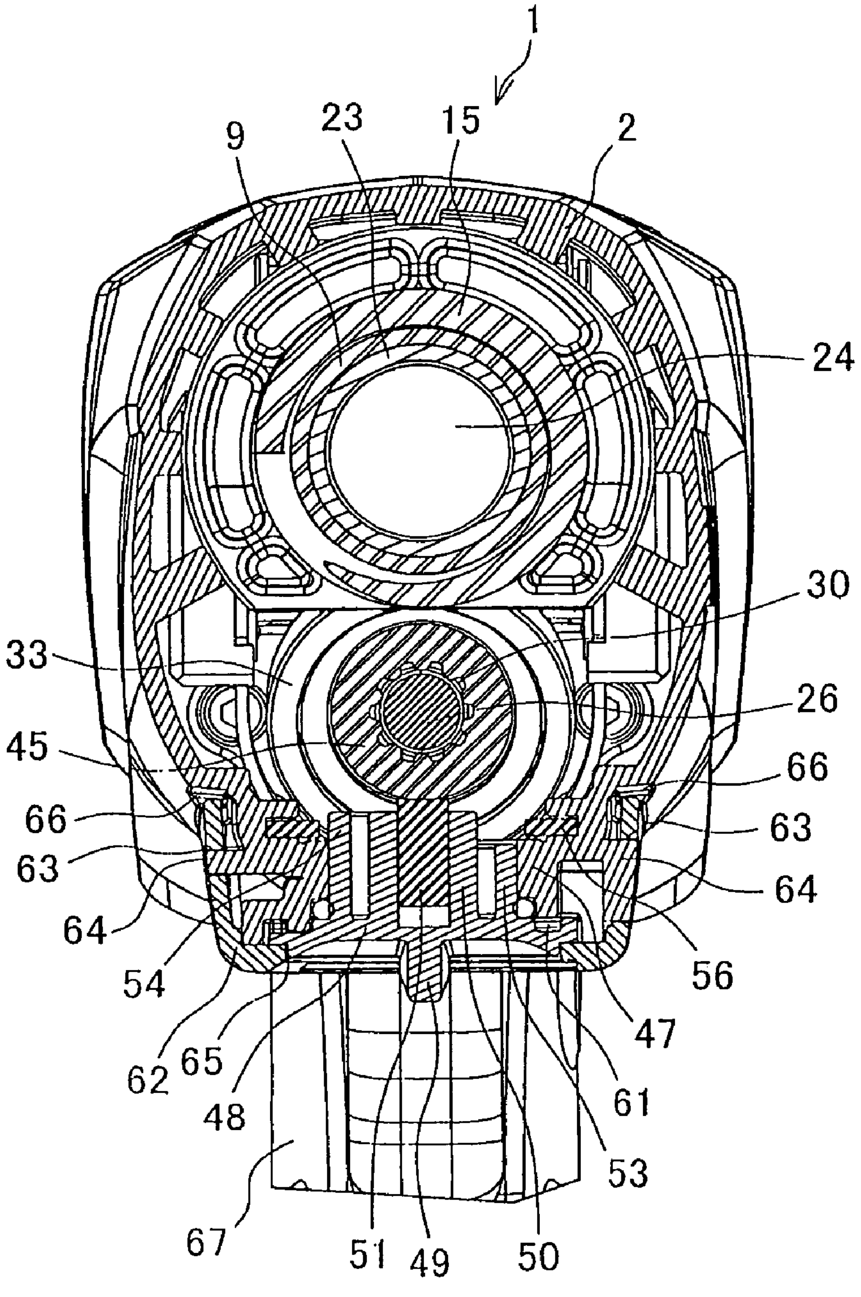
FIG. 2 is a cross section of the hammer drill as it would appear if cut by a plane to show a portion including a clutch.

Referring now to FIGS. 1 and 2, a hammer drill 1 includes a gear housing 2 in which a rotation/impact mechanism is provided, and a motor housing 3 which is disposed rearward (at the right in FIG. 1) of the gear housing 2 and in which a motor 4 is housed. A tool holder 6 is rotatably supported in a front space inside the gear housing 2. The tool holder 6 is capable to hold a bit on a front end portion thereof.

The tool holder 6 is a cylindrical member composed of a middle portion 7 and a large diameter portion 9. The middle portion 7 is rotatably supported at a front end of the gear housing 2 by ball bearings 8. The large diameter portion 9 is disposed rearward of the middle portion 7 inside the gear housing 2, and rotatably supported at an inner housing 10 which is mounted at an inside of a rear portion of the gear housing 2. The front end portion of the tool holder 6 protruded from the gear housing 2 is fitted to an operation sleeve 11 which is configured to be manipulatable so that a bit fitted therein may be fixed in or rendered removable from the front end portion.

A gear 12 is fitted on an outer peripheral surface of the large diameter portion 9 of the tool holder 6. The gear 12 has its front end brought into contact with a stopper ring 13 fitted and fixed on the outer peripheral surface of the large diameter portion 9, so that the gear 12 is located in place along an axis of the tool holder 6. The stopper ring 13 has a plurality of recesses, and a plurality of balls 14 are held in the gear 12. The balls 14 are located at circumferentially spaced positions corresponding to those of the plurality of recesses of the stopper ring 13. A coil spring 15 is fitted on the outer peripheral surface of the large diameter portion 9 and configured to press the plurality of balls 14 into the plurality of recesses of the stopper ring 13 with a washer 16 interposed between the coil spring 15 and the plurality of balls 14, so that rotation of the gear 12 relative to the large diameter portion 9 of the tool holder 6 is restricted. Accordingly, if a load greater than that of which can be withstood by the pressing force of the coil spring 15 is applied, the plurality of balls 14 surmounts out of the plurality of recesses, which allows the gear 12 to rotate at idle, so that transmission of the rotation of the gear 12 to the tool holder 6 is interrupted. In this way, the gear 12 is provided with a mechanism which serves as a torque limiter.

Moreover, inside the middle portion 7 of the tool holder 6, an impact bolt 17 disposed rearward of the bit is reciprocatably accommodated, and a receiving ring 18 fitted on an outer peripheral surface of a rear portion of the impact bolt 17 so as to define a rearmost position to which the impact bolt 17 is allowed to move back. A coil spring 20 is interposed between the receiving ring 18 and a cylindrical cap 19 which is disposed rearward of the receiving ring 18 and mounted in a position inside the large diameter portion 9. The receiving ring 18 is pressed by the coil spring 20 against a stepped portion 21 provided on the middle portion 7 so that the receiving ring 18 is retained in place. The cap 19 has a rear portion configured to hold an O-ring 22. The O-ring 22 is configured to hold a rear end portion of the impact bolt 17 during the normal operation, and to hold a front end portion of the striker 25 described later so as to restrict its reciprocating motion during the lost motion (e.g., when no bit is installed in the tool holder 6).

Inside the large diameter portion 9, a piston cylinder 23 having a cylindrical shape with an open front end and a closed rear end is loosely fitted therein. Inside the piston cylinder 23, a striker 25 is housed with an air chamber 24 interposed between the striker 25 and the closed rear end of the piston cylinder 23, in such a manner that the striker 25 can reciprocate to and fro.

On the other hand, an intermediate shaft 26 is provided below the output shaft 5 of the motor 4 inside the gear housing 2. The intermediate shaft 26 is rotatably supported in a position parallel to the tool holder 6 and the output shaft 5 by ball bearings 27 and 28 provided at front and rear end portions of the intermediate shaft 26. A first gear 29 is provided on an outer peripheral surface of the rear end portion of the intermediate shaft 26 (rearward of the ball bearings 28), to mesh with the output shaft 5. Splines 30 are formed in a middle portion of the intermediate shaft 26. A second gear 31 which constitutes a rotation transmission member is fitted on the outer peripheral surface of the intermediate shaft 26, in a position frontward of the splines 30 (i.e., between the splines 30 and the ball bearings 27), in such a manner that the second gear 31 is rotatable independently of the intermediate shaft 26. The second gear 31 is configured to mesh with the gear 12 of the tool holder 6. A boss sleeve 32 which constitutes a rotatable portion of an impact transmission member is fitted on the outer peripheral surface of the intermediate shaft 26, in a position rearward of the splines 30 (i.e., between the splines 30 and the ball bearings 28), in such a manner that the boss sleeve 32 is rotatable independently of the intermediate shaft 26. A swash bearing 33 is mounted on an outer peripheral surface of the boss sleeve 32, with its axis slanted with respect to a direction perpendicular to the axial direction of the intermediate shaft 26. A connecting arm 34 is protrusively provided on the swash bearing 33, and an upwardly protruded end portion of the connecting arm 34 is pivotally coupled to the rear end of the piston cylinder 23.

Figure 3A:
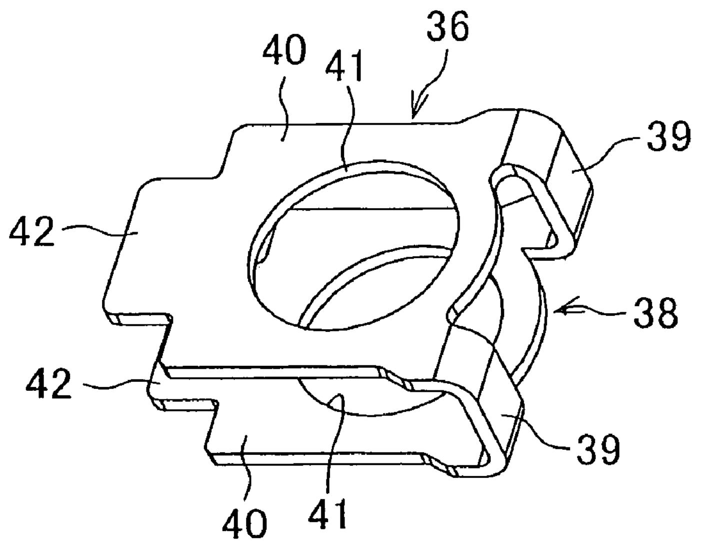
FIG. 3A is a schematic perspective view of a supporting plate.
Figure 3B:
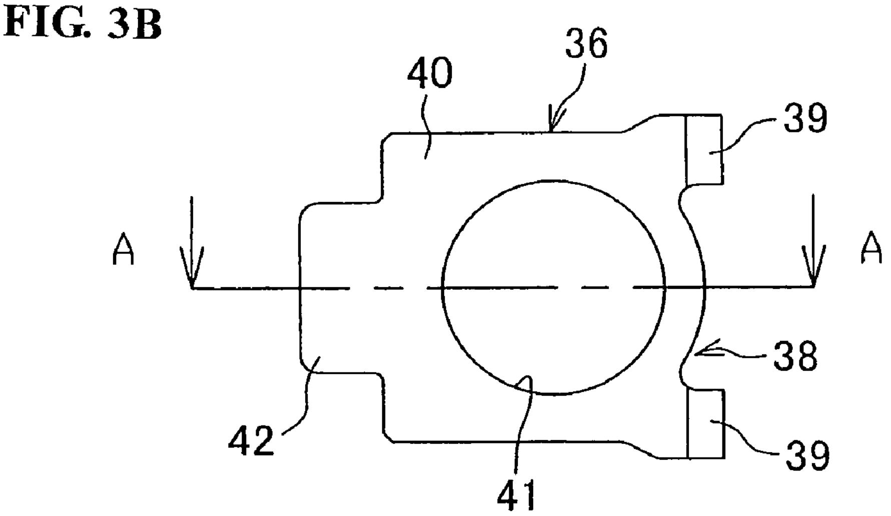
FIG. 3B is a schematic side view of the supporting plate.
Figure 3C:
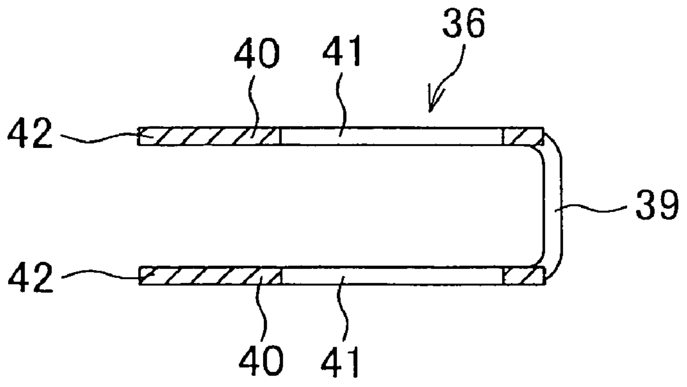
FIG. 3C is a schematic sectional view of the supporting plate taken along line A-A of FIG. 3B.

Connection of the connecting arm 34 with the piston cylinder 23 is established by means of a joint pin 37. To be more specific, a supporting plate 36 is inserted between a pair of connecting pieces 35 protrusively provided in laterally spaced positions at the rear end of the piston cylinder 23. The joint pin 37 is then inserted laterally to pierce through the connecting pieces 35 and the supporting plate 36 such that the connecting pieces 35 and the supporting plate 36 are combined together. The upper end portion of the connecting arm 34 is also pierced laterally (in a direction perpendicular to an axis of the connecting arm 34) with the joint pin 37. The supporting plate 36 is a part made of sheet metal stamped into a belt-like plate and bent into a shape like a letter U, when viewed from above as shown in FIGS. 3A-3C, such that the supporting plate 36 has a width fitting the spacing between the connecting pieces 35. The supporting plate 36 comprises a pair of side plates 40 and a base portion connecting front ends of the side plates 40. The base portion has a trimmed portion 38 and a pair of abutment portions 39. The trimmed portion 38 is positioned at a midsection of the base portion, and a pair of the abutment portions 39 is positioned at upper and lower sections of the base portion. The right and left side plates 40 have through openings 41 in which the joint pin 37 is fitted. Rectangular projections 42 are provided at rear ends of the side plates 40, respectively, and each projection 42 has a vertical dimension smaller than that of the rear end of the side plate 40 and protrudes from a midsection thereof. The base portion of the supporting plate 36 is designed to have a vertical dimension greater than those of the side plates 40.

Accordingly, when the supporting plate 36 with its base portion pointed to the front is fitted into a gap between the connecting pieces 35, the two abutment portions 39 are brought into contact with areas of a rear surface of the piston cylinder 23 in proximity to upper and lower ends thereof, respectively, as shown in FIG. 1. Then, the rear ends of the side plates 40 are protruded beyond the connecting pieces 35 and located in positions rearward of rear ends of the connecting pieces 35. Once the supporting plate 36 is installed in this way, the supporting plate 36 is press-fitted with a moderate force and held between the connecting pieces 35 with the help of elasticity of the side plates 40. As a result, the supporting plate 36 is unlikely to come off during installation, and thus can be installed with ease. Thereafter, the connecting pieces 35 and the supporting plate 36 are pierced with the joint pin 37, and the upper end portion of the connecting arm 34 is pierced with the joint pin 37. The connection between the connecting arm 34 and the piston cylinder 23 is established in this way.

A coil spring 43 is provided rearward of the piston cylinder 23. A front end of the coil spring 43 is in contact with the rear ends of the both side plates 40 with the projections 42 being disposed inside a front end portion of the coil spring 43. A rear end portion of the coil spring 43 is fitted on a boss 44 protrusively provided at an inner surface of the inner housing 10. Accordingly, the coil spring 43 presses the supporting plate 36 against the piston cylinder 23 and urges the piston cylinder 23 to the front.

The splines 30 of the intermediate shaft 26 are engaged (spline-coupled) with a sleeve-like clutch 45 which constitutes a clutch member and is configured to be rotatable together with the intermediate shaft 26 and slidable to and fro in the longitudinal direction (i.e., along the axis of) of the intermediate shaft 26. Thus, the position of the clutch 45, as determined as a result of its sliding operation, along the axis of the intermediate shaft 26 can be varied to bring the clutch 45 into engagement with one or both of the second gear 31 and the boss sleeve 32. To be more specific, the clutch 45 is manipulatable to be slid to: (1) an advanced position in which the clutch 45 is engaged only with the second gear 31 so that the second gear 31 is interlocked with the intermediate shaft 26 in the direction of rotation and rotates together with the intermediate shaft 26; (2) a retreated position in which the clutch 45 is engaged only with the boss sleeve 32 so that the boss sleeve 32 is interlocked with the intermediate shaft 26 in the direction of rotation and rotates together with the intermediate shaft 26; and (3) a middle position in which the clutch 45 is engaged with both of the second gear 31 and the boss sleeve 32 so that the both of them are interlocked with the intermediate shaft 26 in the direction of rotation and rotate together with the intermediate shaft 26. On an outer peripheral surface of the clutch 45, a V-shaped engageable groove 46 is formed around a circumference of the clutch 45.

At a lower wall of the gear housing 2 below the clutch 45, a cylindrical attachment portion 47 is formed in which a mode selector switch 48 as an example of a mode selector is rotatably fitted. This mode selector switch 48 is a generally disk-shaped member with a knob 49 protrusively provided on an underside thereof. The knob 49 is configured to serve as a manipulatable handle which renders the mode selector switch 48 operable from the underside of the gear housing 2. A cylindrical holder 50 is provided, standing upright, at an eccentric position with respect to an axis of rotation of the mode selector switch 48 on top (i.e., on an upper side which faces inward of the gear housing 2) of the mode selector switch 48, and an engaging pin 51 is held in the cylindrical holder 50. The engaging pin 51 has a tapered upper end portion contoured to fit an engageable groove 46 of the clutch 45. The engaging pin 51 is pushed upward by a coil spring 52 inserted into the engaging pin 51 from below, and is fitted in the engageable groove 46. Accordingly, when the mode selector switch 48 is turned, the engaging pin 51 with its upper end portion kept fitted in the engageable groove 46 moves together with the cylindrical holder 50 of the mode selector switch 48 eccentrically around the axis of rotation of the mode selector switch 48. Thus, the clutch 45 is caused to slide frontward or rearward along the axis of the intermediate shaft 26 in accordance with the amount of shift in position, in the axial direction of the intermediate shaft 26, which the engaging pin 51 has undergone.

A regulation cylinder 53 is provided, standing upright, in a coaxial position (concentric with the axis of rotation of the mode selector switch 48) on the upper side of the mode selector switch 48. The regulation cylinder 53 partially has a height equal to that of the cylindrical holder 50 and serves as a regulating means 54, so that the phase of the regulating means 54 can be changed in accordance with rotation of the mode selector switch 48. In a space inside the gear housing 2 frontward of the mode selector switch 48, a lock plate 55 shaped like a letter L in side view is provided. The lock plate 55 comprises a U-shaped lower plate 56 extending in a front/rear direction and a U-shaped front plate 57 extending upward from a front end of the lower plate 56. The front plate 57 is designed and arranged to engage with lock teeth 58 formed in the second gear 31. A coil spring 59 is provided at a front inside of the gear housing 2 and configured to be slidable in the front/rear direction. The lock plate 55 is pressed by the coil spring 59 to a rear position in which the lower plate 56 thereof is in contact with the cylindrical holder 50 or the regulating means 54.

At the lower wall of the gear housing 2, a leaf spring 60 is disposed frontward of the mode selector switch 48, and held at right and left ends thereof, while notches 61 are formed in positions corresponding to rotation positions of respective operation modes, which will be described later, at an outer peripheral edge of the upper side of the mode selector switch 48. The mode selector switch 48 is configured to be retained by the leaf spring 60 elastically fitted in one of the notches 61. The notches 61 serve as detents, and thus provide click-stops during rotating operation of the mode selector switch 48, so that the rotating operation from one operation mode to another can be performed conveniently.

Figure 4:
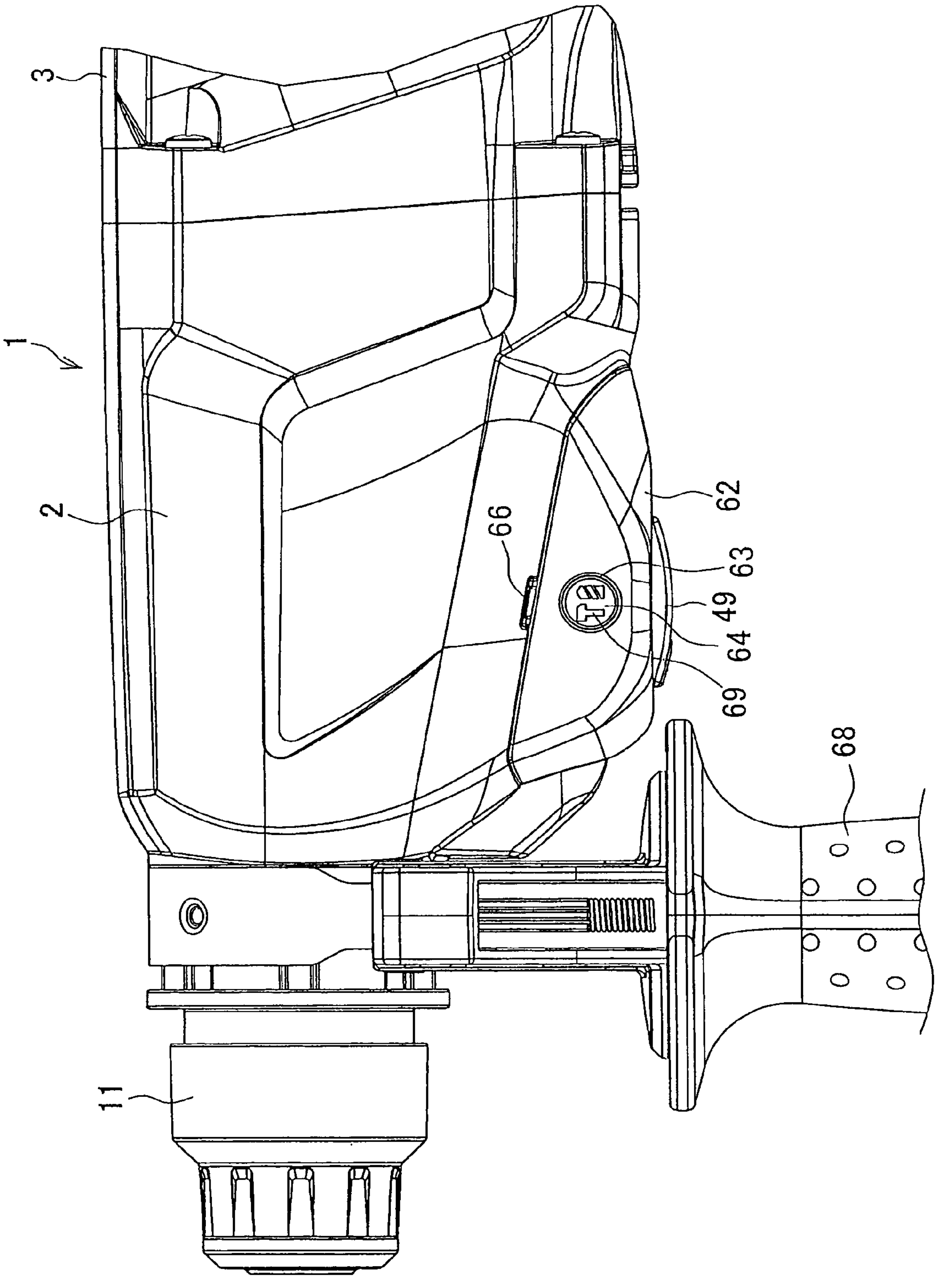
FIG. 4 is a side view of the hammer drill.
Figure 5:
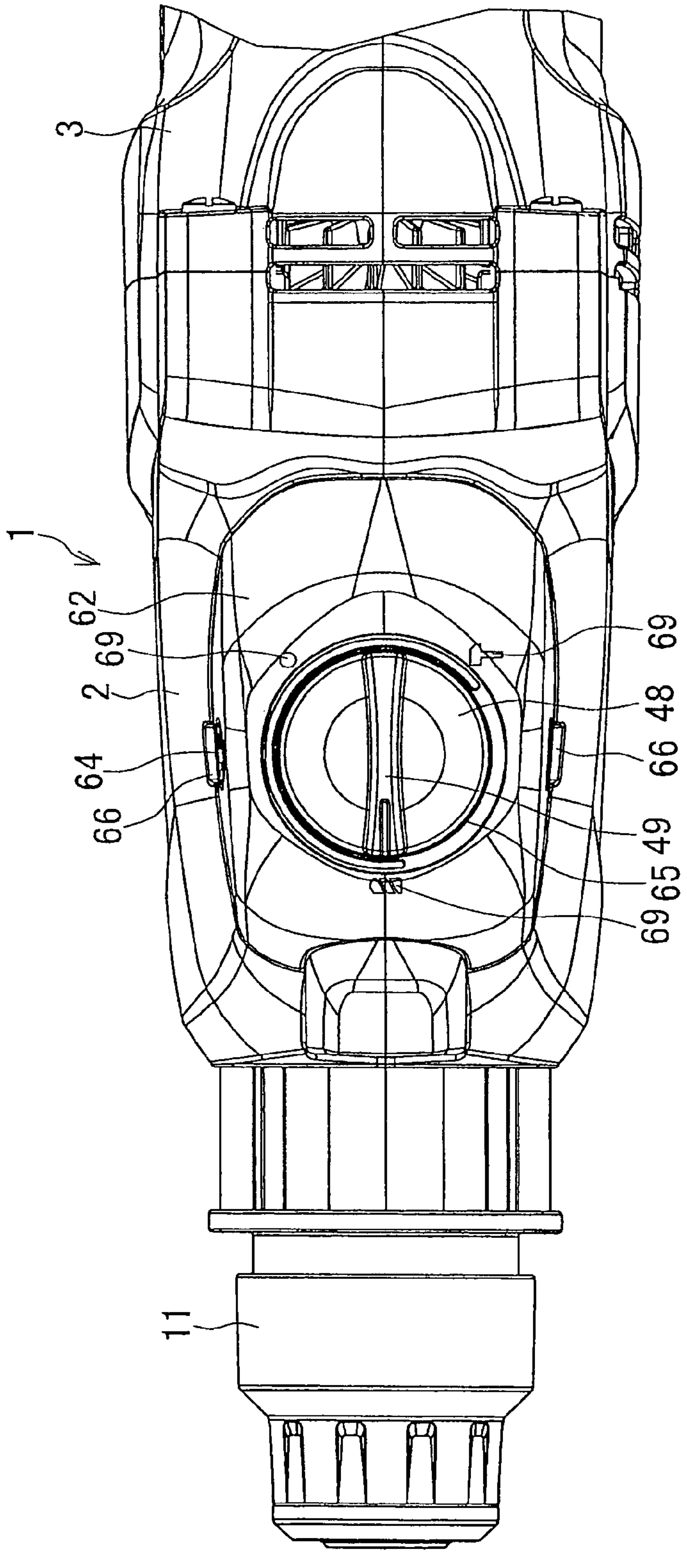
FIG. 5 is a bottom view of the hammer drill.

A cover 62 is provided at the underside of the lower wall of the gear housing 2. This cover 62 is shaped like a dish depressed downward (i.e., opens upward) in the middle, and made of a synthetic resin. The cover has holes 63 provided at right and left side walls thereof and configured to be fitted on round projections 64 that are protrusively provided on right and left surfaces of the cylindrical attachment portion 47, so that the brim of the cover 62 is brought into contact with the underside of the gear housing 2, as shown in FIGS. 4 and 5. In this way, the cover 62 is fitted to the underside of the gear housing 2 in a manner that a bottom surface of the cover 62 and the underside of the gear housing 2 are kept out of contact with each other. In a depressed middle area of the cover 62, a through hole 65 is provided of which an edge is fitted on the peripheral edge of the underside of the mode selector switch 48 when the cover is fitted to the gear housing 2 so that the mode selector switch 48 is supported by the edge of the through hole 65 from below in a thrust direction thereof and prevented from falling off.

Accordingly, when the cover 62 is fitted to the gear housing 2, an area of the undersides of the gear housing 2 and the mode selector switch 48 excluding an area of the knob 49 is covered with the cover 62, and an air space is formed between the cover 2 and the gear housing 2.

At each side of the gear housing 2, a notch 66 is provided in a position above the round projection 64 in close vicinity of the upper edge of the cover 62 as attached. The cover 62 is rendered detachable by the notch 66, as a tip of a screwdriver or the like can be forced into the notch 66 to release the hole 63 from the round projection 64. Denoted by 67 in FIG. 2 is a handle provided at the motor housing 3. The handle 67 projects downward from a position closer to a rear end of the motor housing 3. On the other hand, denoted by 68 in FIGS. 1 and 4 is a side handle provided at the gear housing 2. The side handle 68 projects downward from a position closer to a front end of the gear housing 2.

In the hammer drill 1 configured as described above, when the knob 49 is turned to set the mode selector switch 48 in such an angular position that the knob 49 is pointed to the front as shown in FIG. 5, the cylindrical holder 50 and the engaging pin 51 are located in a frontmost position as shown in FIG. 1. Therefore, the clutch 45 engaged with the engaging pin 51 is slid to an advanced position in which the clutch 45 is engaged with the second gear 31, so that the operation mode is switched into the drill mode. In this operation, the lock plate 55 is caused to move to an advanced position by the cylindrical holder 50, while overcoming the resilience of the coil spring 59. Thus, the lock plate 55 is prevented from being slid and is retained at a position in which the front plate 57 is not engaged with the lock teeth 58 of the second gear 31.

When a bit is installed at the tool holder 6 and the motor 4 is activated with the operation mode set in the drill mode as described above, the intermediate shaft 26 is 15 caused to make a rotation, which is transmitted to the tool holder 6 through the clutch 45, the second gear 31 and the gear 12, to thereby cause the bit to rotate. On the other hand, since the rotation is not transmitted to the boss sleeve 32 from which the clutch 45 in the advanced position is disengaged, the piston cylinder 23 is not caused to reciprocate. Consequently, the bit is caused to make a rotatory motion only.

During this operation, the boss sleeve 32 would tend to rotate by the friction between the outer surface of the rotating intermediate shaft 26 and the inner surface of the boss sleeve 32 in contact. However, as described above, the coil spring 43 is pressing the piston cylinder 23 to the advanced position and the retreating motion of the piston cylinder 23 to be made together with the connecting arm 34 is restricted, and thus the piston cylinder 23 is not caused to reciprocate, so that no unnecessary impacting motion takes place.

Next, when the knob 49 is turned about 90 degrees clockwise as viewed from below to set the mode selector switch 48 in such an angular position that the knob 49 extends in a substantially transverse direction, the cylindrical holder 50 and the engaging pin 51 are caused to rotate clockwise as well. Therefore, the clutch 45 engaged with the engaging pin

51 is slid to a middle position. As a result, the operation mode is switched into the hammer drill mode in which the rear end of the clutch 45 is engaged with the boss sleeve 32 while the clutch 45 is kept engaged with the second gear 31. In this operation, even when the cylindrical holder 50 is moved away, the regulating means 54 shifted in phase comes in contact with the lower plate 56, instead, and blocks the lock plate 55 from sliding; thus, the lock plate 55 remains in a disengaged position. On an underside of the cover 62, as shown in FIG. 5, marks 69 are placed each of which represents an operation mode corresponding to the angular position of the mode selector switch 48. In particular, the round projection 64 which is located in a direction to which the knob 49 is pointed in the hammer drill mode is utilized for exhibiting a mark corresponding to the hammer drill mode (see FIG. 4).

When the motor 4 is activated with the operation mode set in this hammer drill mode, the rotation of the intermediate shaft 26 is transmitted through the clutch 45, the second gear 31 and the gear 12, to the tool holder 6, to thereby cause the bit to rotate. On the other hand, the same rotatory motion is transmitted to the boss sleeve 32, too, which is engaged with the clutch 45. Therefore, the swash bearing 33 is caused to swing to and fro, and thus the connecting arm 34 interlocked with the swash bearing 33 causes the piston cylinder 23 to reciprocate while overcoming the resilience of the coil spring 43. This reciprocating motion of the piston cylinder 23 causes the striker 25 inside the piston cylinder 23 to synchronously reciprocate and strike the impact bolt 17 with which the rear end of the bit is in contact. Consequently, the impacting motion as well as the rotatory motion is imparted to the bit.

Next, when the knob 49 is turned further about 45 degrees clockwise, the cylindrical holder 50 and the engaging pin 51 are caused to rotate clockwise as well and to move to the rear. Therefore, the clutch 45 engaged with the engaging pin 51 is slid to a retreated position, and disengaged from the second gear 31. As a result, the operation mode is switched into the hammer mode of a particular type (neutral mode) in which the clutch 45 is engaged with the boss sleeve 32 only. In this operation, even when the cylindrical holder 50 is moved away, the regulating means 54 shifted in phase comes in contact with the lower plate 56, instead, and blocks the lock plate 55 from sliding; thus, the lock plate 55 remains in a disengaged position.

When the motor 4 is activated with the operation mode set in this type of hammer mode, the rotation of the intermediate shaft 26 is not transmitted to the second gear 31, and the tool holder 6 is not caused to rotate. However, this rotatory motion of the intermediate shaft 26 causes the boss sleeve 32 to make a rotation, which in turn causes the piston cylinder 23 to reciprocate. Consequently, only the impacting motion is imparted to the bit. It is to be noted that since the rotation of the second gear 31 is not locked in this mode of operation, the tool holder 6 is allowed to rotate freely, and thus an angle of the bit around its axis can be changed as desired.

Next, when the knob 49 is turned further about 90 degrees clockwise, the cylindrical holder 50 and the engaging pin 51 are caused to rotate clockwise as well. The mode selector switch 48 in this mode is positioned in a phase axisymmetric with that in the neutral mode about a line containing the center of rotation of the mode selector switch 48 and extending in the front/rear direction. Therefore, the position of the mode selector switch 48 in the front/rear direction is not changed; thus, the clutch 45 remaining in the retreated position is kept engaged with the boss sleeve 32, and disengaged from the second gear 31. As a result, the operation mode is switched into the hammer mode of another type in which the clutch 45 is engaged with the boss sleeve 32 only, but the regulating means 54 is shifted in phase and moved rearward of the cylindrical holder 50. In this way, the lock plate 55 comes to a retreated position in which the lower plate 56 is in contact with the cylindrical holder 50, and causes the front plate 57 to engage with the lock teeth 58 of the second gear 31.

Accordingly, when the motor 4 is activated with the operation mode set in this type of the hammer mode, the rotation of the intermediate shaft 26 is not transmitted to the second gear 31, and the tool holder 6 is not caused to rotate. However, this rotatory motion of the intermediate shaft 26 causes the boss sleeve 32 to make a rotation, which in turn causes the piston cylinder 23 to reciprocate. Consequently, only the impacting motion is imparted to the bit. In this operation mode, unlike the neutral mode, the rotation of the tool holder 6 is locked, and thus the angle of the bit around its axis is fixed.

When the hammer drill 1 is used in either of the operation modes as described above, heat is generated around the intermediate shaft 26 which produces friction with a number of components in contact therewith, and the thus-generated heat is transmitted to the gear housing 2. However, in the present embodiment, the cover 62 is provided under the gear housing 2 with an air space interposed between the gear housing 2 and the cover 62. Therefore, the heat transmitted to the gear housing 2 is not easily transmitted to the cover 62, and an undesired increase in a temperature of the cover 62 can be suppressed. For this reason, even if an operator touches the cover 62 during the operation of turning the knob 49 of the mode selector switch 48 under the gear housing 2, he/she will never feel uncomfortable due to heat.

As described above, with the hammer drill 1 according to the present embodiment, a coil spring 43 is disposed rearward of the piston cylinder 23 so as to press the piston cylinder 23 to an advanced position when the hammer drill 1 operates in the drill mode, and a supporting plate 36 is disposed at the rear end of the piston cylinder 23. The supporting plate 36 is shaped like a letter U, and includes a pair of side plates 40 and a base portion connecting the front ends of the side plates 40. The side plates 40 have openings configured to hold the joint pin 37 on which the connecting arm 34 is pivoted. The base portion is in contact with the rear surface of the piston cylinder 23, and the rear ends of the side plates 40 are in contact with the front end of the coil spring 43. Accordingly, an unnecessary impacting motion in the drill mode can effectively be prevented without diminishing the durability of the piston cylinder 23.

In the aforementioned embodiment, particularly, the projections 42 that are configured to be disposed inside the front end portion of the coil spring 43 are provided at the rear ends of the side plates 40, and thus the coil spring 43 is prevented from coming off from the supporting plate 36, so that the pressing action of the coil spring 43 applied through the supporting plate 36 can be maintained securely.

Furthermore, the base portion of the supporting plate 36 is designed to have a vertical dimension greater than those of the side plates 40, and thus the supporting plate 36 can be stably located on the piston cylinder 23, so that the supporting plate 36 provided according to the present embodiment will not produce a rattle by any means.

In addition, the trimmed portion 38 configured to be out of contact with the rear surface of the piston cylinder 23 is disposed in a midsection between the upper and lower sections of the base portion, and thus a desirable elasticity may be imparted to the supporting plate 36 in the transverse direction, so that the supporting plate 36 can easily be installed between the connecting pieces 35. Besides, the trimmed portion 38 leads to the weight reduction of the supporting plate 36.

The supporting plate consistent with the present invention is not limited to the above-described embodiment. For example, the projections provided at the rear ends of the side plates may be designed to be longer in length, and/or to be different in shape (e.g., semicircular, etc.), and rather can be omitted as the case may be. Moreover, the base portion may be provided without a trimmed portion, the base portion may be designed such that only the front end faces of the abutment portions have a greater vertical dimension, and alternatively the base portion may not necessarily have a vertical dimension greater than those of the side plates but may have the same vertical dimension as those of the side plates; that is, the vertical dimension may be selected, as appropriate, depending upon the dimensions of the rear end surface of the piston cylinder.

Any other changes or modifications in design may also be made, where appropriate, to the other components of the hammer drill. For example, the present invention may be applied to an alternative embodiment in which no interjacent element such as an impact bolt is provided and the impactor (striker) is caused to directly strike the bit.

The invention claimed is:

1. A hammer drill comprising:

a housing;

a tool holder rotatably supported in a front space inside the housing, the tool holder having a front end portion configured to hold a bit;

a piston cylinder reciprocatably disposed in a rear space inside the tool holder;

an impactor disposed inside the piston cylinder and configured to strike the bit as installed at the front end portion of the tool holder;

an intermediate shaft rotatably supported in a position below and parallel to the tool holder inside the housing;

a motor disposed rearward of the housing, the motor having an output shaft, a rotatory motion of which is transmitted to the intermediate shaft;

a rotation transmission member disposed on a front portion of the intermediate shaft, the rotation transmission member being rotatable independently of the intermediate shaft, and configured such that a rotation of the rotation transmission member causes a rotatory motion of the intermediate shaft to be transmitted to the tool holder;

a impact transmission member disposed on a rear portion of the intermediate shaft, the impact transmission member comprising a portion rotatable independently of the intermediate shaft and a connecting arm pivotally coupled to a rear end of the piston cylinder, the impact transmission member being configured such that a rotation of the impact transmission member converts the rotatory motion of the intermediate shaft into a reciprocating motion, which is transmitted to the piston cylinder;

a clutch member configured to be rotatable together with the intermediate shaft and slidable in an axial direction of the intermediate shaft between the rotation transmission member and the impact transmission member, the clutch member being manipulatable from outside the housing to be slid until the clutch member is engaged with both the rotation transmission member and the impact transmission member, or engaged with either one and disengaged from the other, thereby allowing selection of operation modes which comprises: a drill mode in which only the rotation transmission member is caused to rotate so that the tool holder rotates; a hammer mode in which only the impact transmission member is caused to rotate so that the piston cylinder reciprocates; a hammer drill mode in which both the rotation transmission member and the impact transmission member are caused to rotate so that the tool holder rotates and the piston cylinder reciprocates;

a coil spring disposed rearward of the piston cylinder inside the housing so as to press the piston cylinder to an advanced position when the hammer drill is in the drill mode;

a supporting plate disposed at the rear end of the piston cylinder, wherein the supporting plate comprises a pair of side plates having front ends, rear ends and openings respectively, and a base portion connecting the front ends of the side plates, the base portion of the supporting plate being in contact with a rear surface of the piston cylinder, the rear ends of the side plates being in contact with a front end of the coil spring, and the openings of the side plates being configured to hold a pin on which the connecting arm is pivoted.

2. The hammer drill according to claim 1, wherein the supporting plate further comprises projections provided at the rear ends of the side plates and configured to be disposed inside a front end portion of the coil spring.

3. The hammer drill according to claim 1, wherein the base portion of the supporting plate has a vertical dimension greater than those of the side plates.

4. The hammer drill according to claim 2, wherein the base portion of the supporting plate has a vertical dimension greater than those of the side plates.

5. The hammer drill according to claim 1, wherein the base portion of the supporting plate has a trimmed portion disposed in a midsection between upper and lower sections of the base portion at the front ends of the side plates and configured to be out of contact with the rear surface of the piston cylinder.

6. The hammer drill according to claim 1, wherein a rear end portion of the coil spring is fitted on a boss provided at an inner surface of the housing, whereby the coil spring is located in place.

7. The hammer drill according to claim 1, wherein the rotation transmission member comprises a gear.

8. The hammer drill according to claim 7, further comprising:

a driven gear rotatably fitted on an outer peripheral surface of the tool holder and configured to mesh with the gear of the rotation transmission member; and a torque limiter configured to restrict rotation of the driven gear so as to integrate the driven gear with the tool holder when torque applied to the driven gear is not greater than a predetermined level of torque, and to allow the driven gear to rotate at idle so as to interrupt transmission of the rotation of the driven gear to the tool holder when the torque applied to the driven gear is greater than the predetermined level of torque.

9. The hammer drill according to claim 8, wherein the torque limiter comprises:

a stopper ring having a plurality of recesses, the stopper ring being fixed on the outer peripheral surface of the tool holder;

a plurality of balls held in the driven gear in positions corresponding to those of the plurality of recesses of the stopper ring; and a coil spring configured to press the plurality of balls into the plurality of recesses of the stopper ring.

10. The hammer drill according to claim 1, wherein the rotatable portion of the impact transmission member is a boss sleeve and further comprises a swash bearing which is mounted on an outer peripheral surface of the boss sleeve and on which the connecting arm is protrusively provided, an axis of the swash bearing being slanted with respect to a direction perpendicular to the axial direction of the intermediate shaft.

11. The hammer drill according to claim 1, further comprising a mode selector rotatably mounted at a lower wall of the housing in a manner operable from an underside of the housing, and an engaging pin mounted in an eccentric position on top of the mode selector, wherein the engaging pin engages in a groove formed on an outer peripheral surface of the clutch member so that operation of rotating the mode selector causes the engaging pin to move around an axis of rotation of the mode selector, and thereby causes the clutch member to slide in the axial direction.

12. The hammer drill according to claim 11, further comprising a cover with which an area of the underside of the lower wall of the housing excluding an area of a knob of the mode selector is covered in a noncontact manner.

13. The hammer drill according to claim 1, further comprising an impact bolt disposed inside the tool holder reciprocatably between the bit as installed and the impactor, so that the impactor in operation indirectly strikes the bit by means of the impact bolt.

* * * * *